United States Patent
Saint-Marcel et al.

(10) Patent No.: US 11,087,064 B1
(45) Date of Patent: Aug. 10, 2021

(54) SYSTEM AND METHOD FOR ANALYZING ONE OR MORE ELECTROMIGRATION RULES ASSOCIATED WITH AN ELECTRONIC CIRCUIT DESIGN

(71) Applicant: Cadence Design Systems, Inc., San Jose, CA (US)

(72) Inventors: Laurent René Saint-Marcel, Mouans-Sartoux (FR); Olivier Berger, Le Rouret (FR)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/817,924

(22) Filed: Mar. 13, 2020

(51) Int. Cl.
| | |
|---|---|
| *G06F 30/3953* | (2020.01) |
| *G06F 30/31* | (2020.01) |
| *G06F 30/392* | (2020.01) |
| *G06F 119/06* | (2020.01) |
| *G06F 119/08* | (2020.01) |

(52) U.S. Cl.
CPC .......... *G06F 30/3953* (2020.01); *G06F 30/31* (2020.01); *G06F 30/392* (2020.01); *G06F 2119/06* (2020.01); *G06F 2119/08* (2020.01)

(58) Field of Classification Search
CPC .... G06F 30/3953; G06F 30/31; G06F 30/392; G06F 2119/06; G06F 2119/08; G06F 119/06; G06F 119/08
See application file for complete search history.

(56) References Cited

U.S. PATENT DOCUMENTS

| | | | |
|---|---|---|---|
| 9,830,417 B1* | 11/2017 | Ginetti | G06F 16/22 |
| 10,380,314 B1 | 8/2019 | Saint-Marcel | |
| 2009/0294973 A1* | 12/2009 | Chanda | H01L 23/528 257/767 |
| 2013/0055184 A1* | 2/2013 | Shroff | G06F 30/398 716/112 |
| 2013/0326448 A1* | 12/2013 | Demircan | G06F 30/367 716/112 |
| 2018/0321821 A1* | 11/2018 | Qian | G06F 16/5854 |

\* cited by examiner

*Primary Examiner* — Vuthe Siek
(74) *Attorney, Agent, or Firm* — Mark H. Whittenberger, Esq.; Holland & Knight LLP

(57) ABSTRACT

The present disclosure relates to a method for use with an electronic design. Embodiments may include receiving, using a processor, the electronic design and estimating a wire width associated with the electronic design based upon, at least in part, a current in a wire, a layer of the wire, a temperature, and an electromigration length. Embodiments may further include allowing, at a graphical user interface, a user to make an edit to a shape or a layer of the wire and generating a revised EM length, based upon, at least in part, the edit. Embodiments may also include generating one or more EM length breakpoints based upon, at least in part, the revised EM length and one or more EM rules.

20 Claims, 21 Drawing Sheets

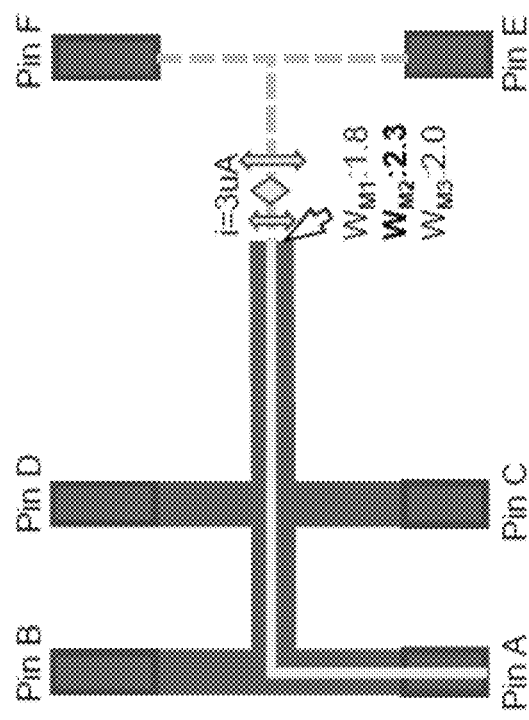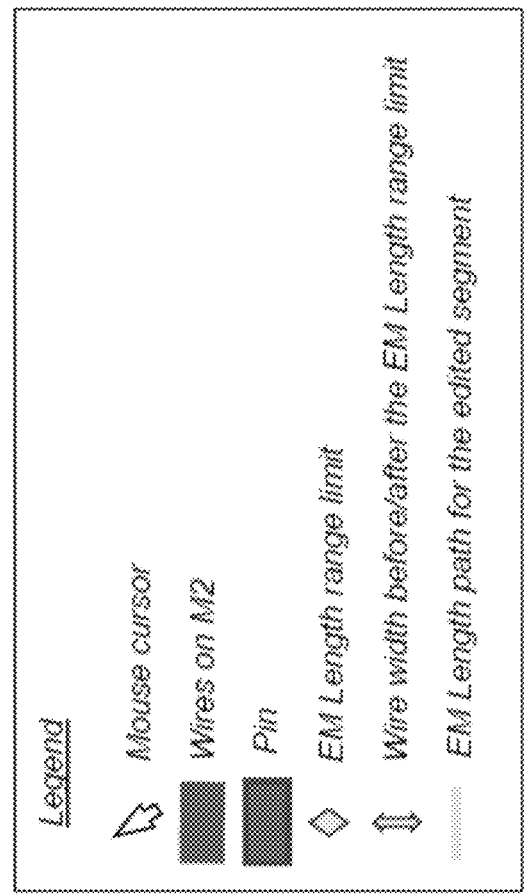
FIG. 19

SYSTEM AND METHOD FOR ANALYZING ONE OR MORE ELECTROMIGRATION RULES ASSOCIATED WITH AN ELECTRONIC CIRCUIT DESIGN

FIELD OF THE INVENTION

The embodiments of the present disclosure relate to a method of electronic circuit design, and more particularly, to a method for satisfying electromigration rules associated with an electronic circuit design.

BACKGROUND

With electronic designs becoming smaller, it is crucial to fix current density and electromigration (EM) errors sooner in the design flow. Furthermore, the electromigration rules provided by foundries are more and more complex. Having tools that can consider all the parameters of the EM rules and optimize each one, improves the efficiency of a particular design. Usually, verification tools need a fully routed net to be able to extract the necessary information used to verify the rules. Then the rules may be evaluated, the wires may be updated and/or rerouted to solve EM issues.

SUMMARY

Accordingly, an embodiment of the present disclosure is directed to a computer-implemented method for use with an electronic design. The method may include receiving, using a processor, the electronic design and estimating a wire width associated with the electronic design based upon, at least in part, a current in a wire, a layer of the wire, a temperature, and an electromigration (EM) length. The method may further include allowing, at a graphical user interface, a user to make an edit to a shape or a layer of the wire and generating a revised EM length, based upon, at least in part, the edit. The method may also include generating one or more EM length breakpoints based upon, at least in part, the revised EM length and one or more EM rules.

One or more of the following features may be included. In some embodiments, the method may include graphically displaying, at the graphical user interface, one or more EM length breakpoints. The EM length may correspond to a longest path between two end-points without accounting for a direction of current flow. The method may include displaying an EM length path at the graphical user interface. The method may further include displaying an estimated width associated with a layer below. The method may also include displaying an estimated width associated with a routing layer. The method may further include displaying an estimated width associated with a layer above.

In another embodiment of the present disclosure a computer-readable storage medium having stored thereon instructions, which when executed by a processor result in a number of operations is provided. Operations may include receiving, using a processor, the electronic design and estimating a wire width associated with the electronic design based upon, at least in part, a current in a wire, a layer of the wire, a temperature, and an electromigration length. Operations may further include providing, at a graphical user interface, a user to make an edit to a shape or a layer of the wire and generating a revised EM length, based upon, at least in part, the edit. Operations may also include generating one or more EM length breakpoints based upon, at least in part, the revised EM length and one or more EM rules.

One or more of the following features may be included. In some embodiments, the method may include graphically displaying, at the graphical user interface, one or more EM length breakpoints. The EM length may correspond to a longest path between two end-points without accounting for a direction of current flow. Operations may include displaying an EM length path at the graphical user interface. The method may further include displaying an estimated width associated with a layer below. Operations may also include displaying an estimated width associated with a routing layer. Operations may further include displaying an estimated width associated with a layer above.

In yet another embodiment of the present disclosure a computing system for use in an electronic circuit design is provided. The system may include at least one processor configured to receive the electronic design and estimate a wire width associated with the electronic design based upon, at least in part, a current in a wire, a layer of the wire, a temperature, and an electromigration length. The at least one processor may be further configured to allow, at a graphical user interface, a user to make an edit to a shape or a layer of the wire. The at least one processor may be further configured to generate a revised EM length, based upon, at least in part, the edit. The at least one processor may be further configured to generate one or more EM length breakpoints based upon, at least in part, the revised EM length and one or more EM rules.

One or more of the following features may be included. In some embodiments, the at least one processor may be further configured to graphically display, at the graphical user interface, one or more EM length breakpoints. The EM length may correspond to a longest path between two end-points without accounting for a direction of current flow. The at least one processor may be further configured to display an EM length path at the graphical user interface. The at least one processor may be further configured to display an estimated width associated with a layer below. The at least one processor may be further configured to display an estimated width associated with a routing layer.

It is to be understood that both the foregoing general description and the following detailed description are exemplary and explanatory and are intended to provide further explanation of embodiments of the present disclosure as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIGS. 16-21 are illustrations of schematics according to an embodiment of the present disclosure.

DETAILED DESCRIPTION

Figure 1:
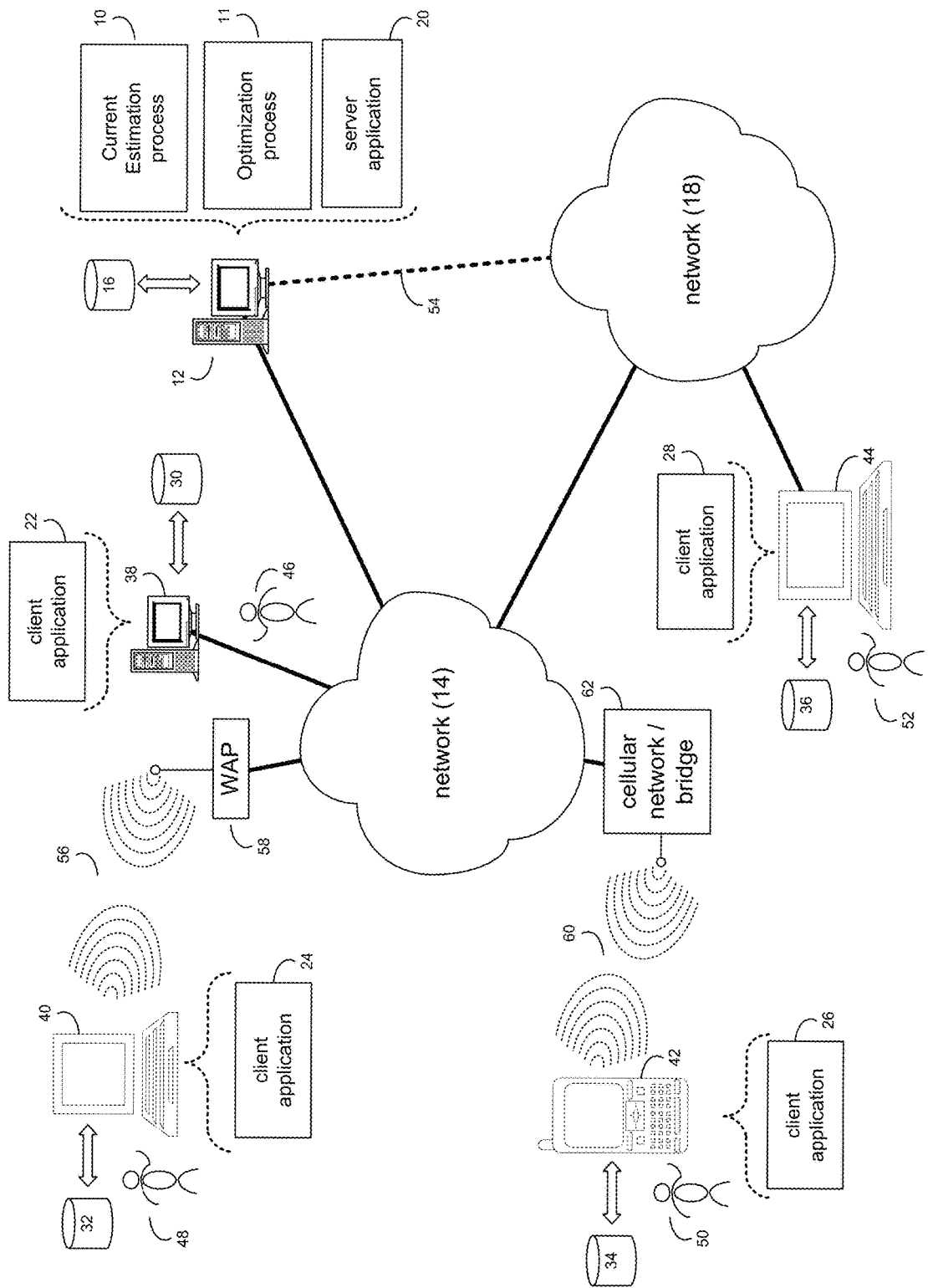
FIG. 1 diagrammatically depicts a current estimation process coupled to a distributed computing network.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings denote like elements.

Referring to FIG. 1, there is shown current estimation process 10 and optimization process 11 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, the current estimation process may reside on a client electronic device, such as a personal computer, notebook computer, personal digital assistant, or the like.

As will be discussed below in greater detail, current estimation process 10 may be used to estimate the current in a wire that is being created manually by creating a virtual terminal. The current of this virtual terminal may correspond to the missing current in the partial routed net graph as such the sum of the terminal's current on the partial net graph is now equal to 0. The virtual terminal may be inserted either at the beginning or the end of the wire which current must be estimated. The location of this virtual terminal is critical to get the best current estimation. Accordingly, embodiments of current estimation process 10 may allow for estimation of the current of a wire during its manual edition, before the net is fully routed.

The instruction sets and subroutines of current estimation process 10 and/or optimization process 11, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute current estimation process 10 and/or optimization process 11. Examples of client applications 22, 24, 26, 28 may include, but are not limited to, design verification tools such as those available from the assignee of the present disclosure. These applications may also be executed by server computer 12. In some embodiments, current estimation process 10 and/or optimization process 11 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the current estimation process and/or optimization process 11 may be a client-side application (not shown) residing on one or more client electronic devices 38, 40, 42, 44 (e.g., stored on storage devices 30, 32, 34, 36, respectively). As such, the current estimation process and/or optimization process 11 may be a stand-alone application that interfaces with a client application (e.g., client applications 22, 24, 26, 28), or may be an applet/application that is executed within a client application. As such, the current estimation process and/or optimization process 11 may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize formal analysis, testbench simulation, and/or hybrid technology features verify a particular integrated circuit design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, current estimation process 10 and/or optimization process 11 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

As discussed above, with electronic designs becoming smaller and smaller it is more and more important to be aware of and able to fix current density and electromigration errors sooner in the design flow. This requires current estimation in each wire of a design. Usually, tools need a fully routed net to be able to extract the current that goes through each wire, however estimating the current in each wire of a partially routed net is a complex problem. On a partially routed net, it is not possible to know what the future connections of a wire may be and how many terminals it will connect with. A future connection might completely change the net topology and the current that goes through a wire. Furthermore, to be able to propagate the current in every wire of a net, a designer needs to have the sum of all terminals current equal to zero in order to satisfy the Kirchhoff's current laws, which is not the case until the net is fully routed and connected to all terminals.

Accordingly, embodiments of current estimation process 10 may be configured to estimate the current in a wire of a partially routed net using a virtual terminal. As will be discussed below in greater detail, current estimation process 10 may be used to estimate the current in a wire that is being created manually by creating a virtual terminal. The current of this virtual terminal is the missing current in the partial routed net graph (so the sum of the terminal's current on the partial net graph is now equal to 0). The virtual terminal may be inserted either at the beginning or the end of the wire which current must be estimated. The location of this virtual terminal is critical to get the best current estimation. Accordingly, embodiments of current estimation process 10 may allow for estimation of the current of a wire during its manual edition, before the net is fully routed.

Usually, the current extraction is performed only on a fully routed net. In this way, routers usually plan the entire net topology using wire planning algorithms which are quite slow. They know all of the terminals that will be connected by a wire and the sum of the terminals' current in the entire net graph satisfy the Kirchhoff's current laws. Moreover, checkers that check design rule errors or Electromigration (EM) violations only run on a fully routed net.

For partially routed designs that are routed manually by the user, if the sum of the terminals current is not equal to zero, the engines may decrease the current of the source terminals so that it matches the current of the sink. However, this approach may underestimate the current that can go through a wire which is not the desired behavior when computing the current to get a wire width that will avoid EM violations.

As such, and in order to avoid current density and EM design errors, it may be necessary to estimate the wire width that is deduced from the wire current as soon as possible in the design process to converge more quickly to a valid design. Being able to estimate the wire width (without underestimating it) early in the design flow and during manual wire creation is a strong advantage to create an EM error free design more quickly.

Trying to estimate the current interactively, before the net is completely routed requires precision and it may be better to overestimate the current rather than underestimate it. For example, if the current is overestimated, it may be possible to apply design modifications that will avoid EM violations and design congestion issues. Conventional solutions tend to underestimate the current and the wire width, leading to EM violations and future design congestion issues.

Figure 2:
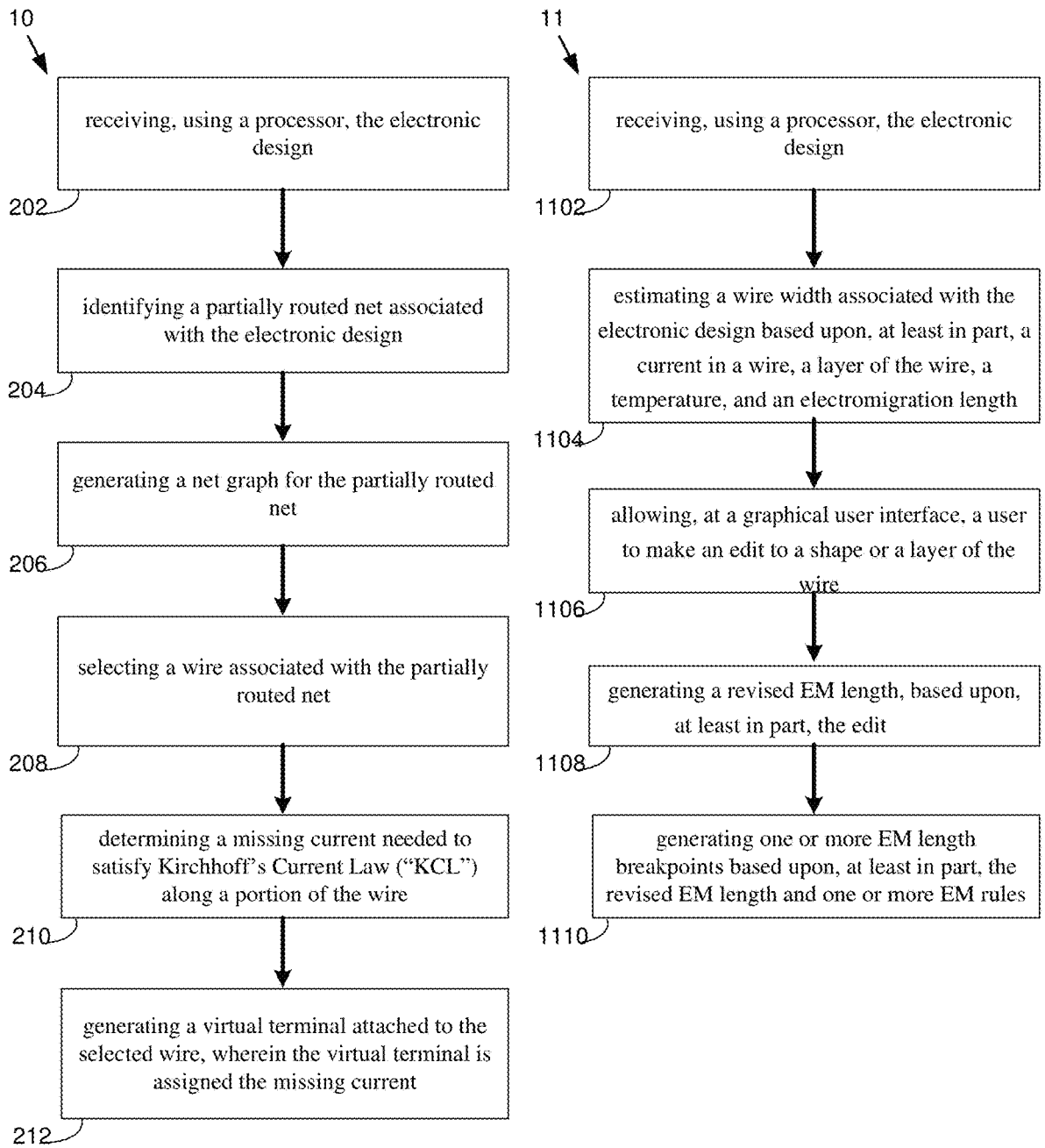
FIG. 2 is an exemplary flowchart of a current estimation process according to an embodiment of the present disclosure.

Referring now to FIG. 2, a flowchart depicting an embodiment consistent with current estimation process 10 is provided. The method may include receiving (202), using a processor, the electronic design and identifying (204) a partially routed net associated with the electronic design. Embodiments may further include generating (206) a net graph for the partially routed net and selecting (208) a wire associated with the partially routed net. Embodiments may also include determining (210) a missing current needed to satisfy Kirchhoff's Current Law ("KCL") along a portion of the wire and generating (212) a virtual terminal attached to the selected wire, wherein the virtual terminal is assigned the missing current. Numerous other operations are also within the scope of the present disclosure as provided in further detail hereinbelow.

Figure 3:
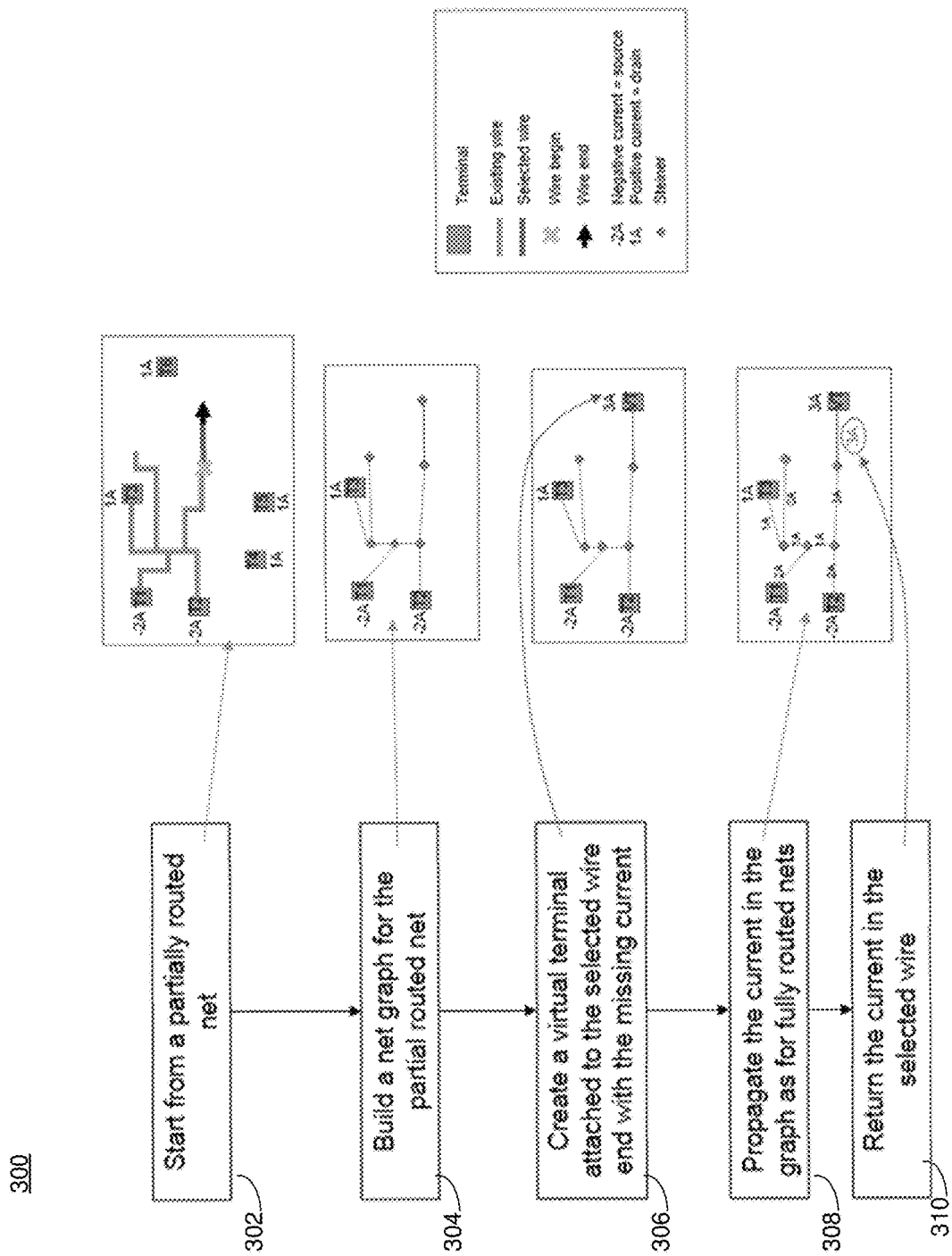
FIG. 3 is an illustration of a schematic of a current estimation process according to an embodiment of the present disclosure.

Referring also to FIG. 3, embodiments of current estimation process 10 may be configured to estimate the current in a wire A of a partially routed net 302. In this way, the process may include building 304 a partial net graph with only terminals and wires physically connected to wire A. The process may further include creating 306 a virtual terminal, and assigning it the missing current of the partial net graph (e.g., virtual terminal current=–sum (all connected terminals current)). The process may also include inserting the virtual terminal in the graph. The location of the terminal may be critical to get the best current estimation. The process may also include propagating 308 the current in the partial net graph as if it were a complete graph. This is possible as the sum of the current of all terminals is null thanks to the virtual terminal. The process may then return 310 the current of wire.

Figure 4:
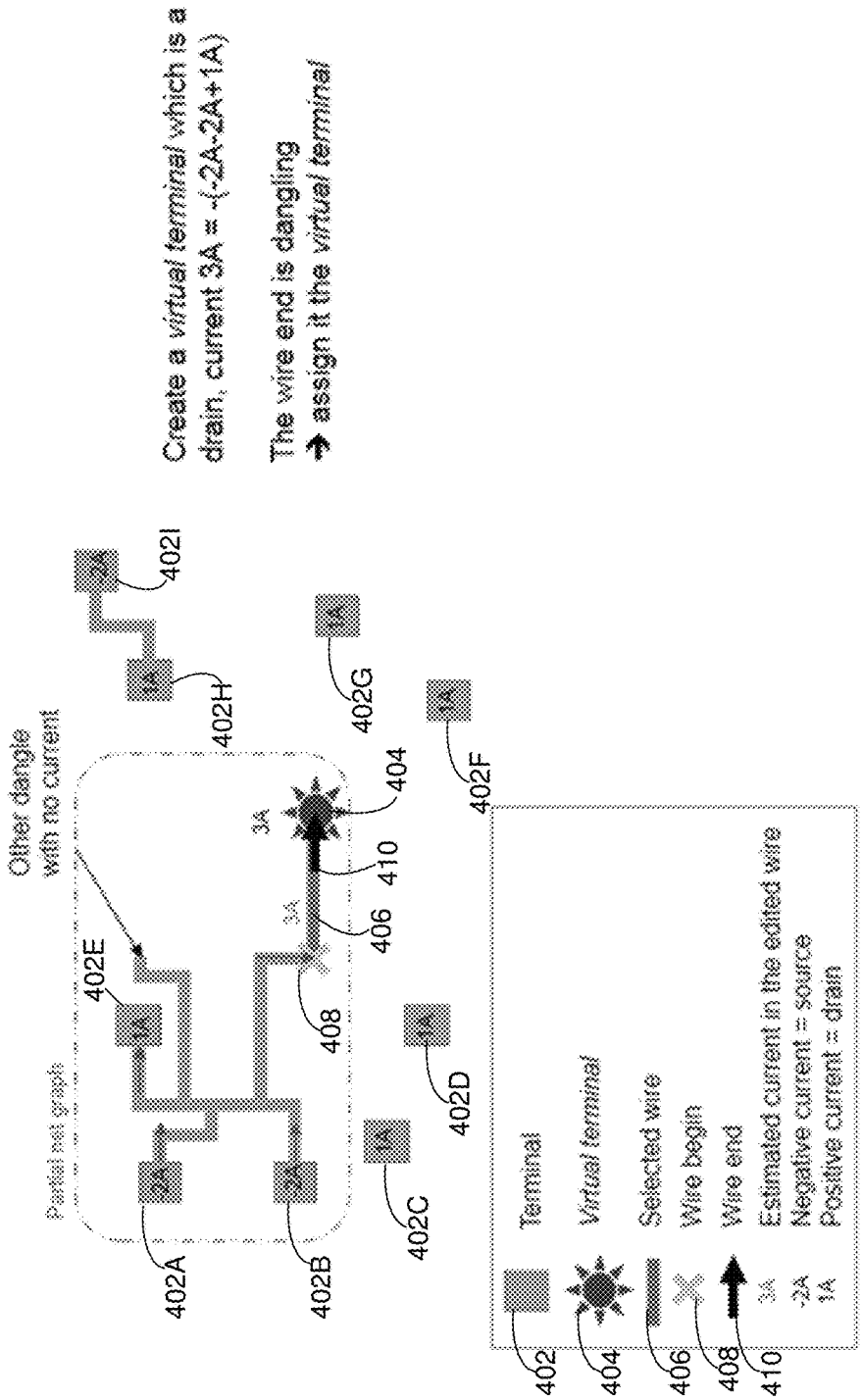
FIG. 4 is an illustration of a schematic of a current estimation process according to an embodiment of the present disclosure.
Figure 5:
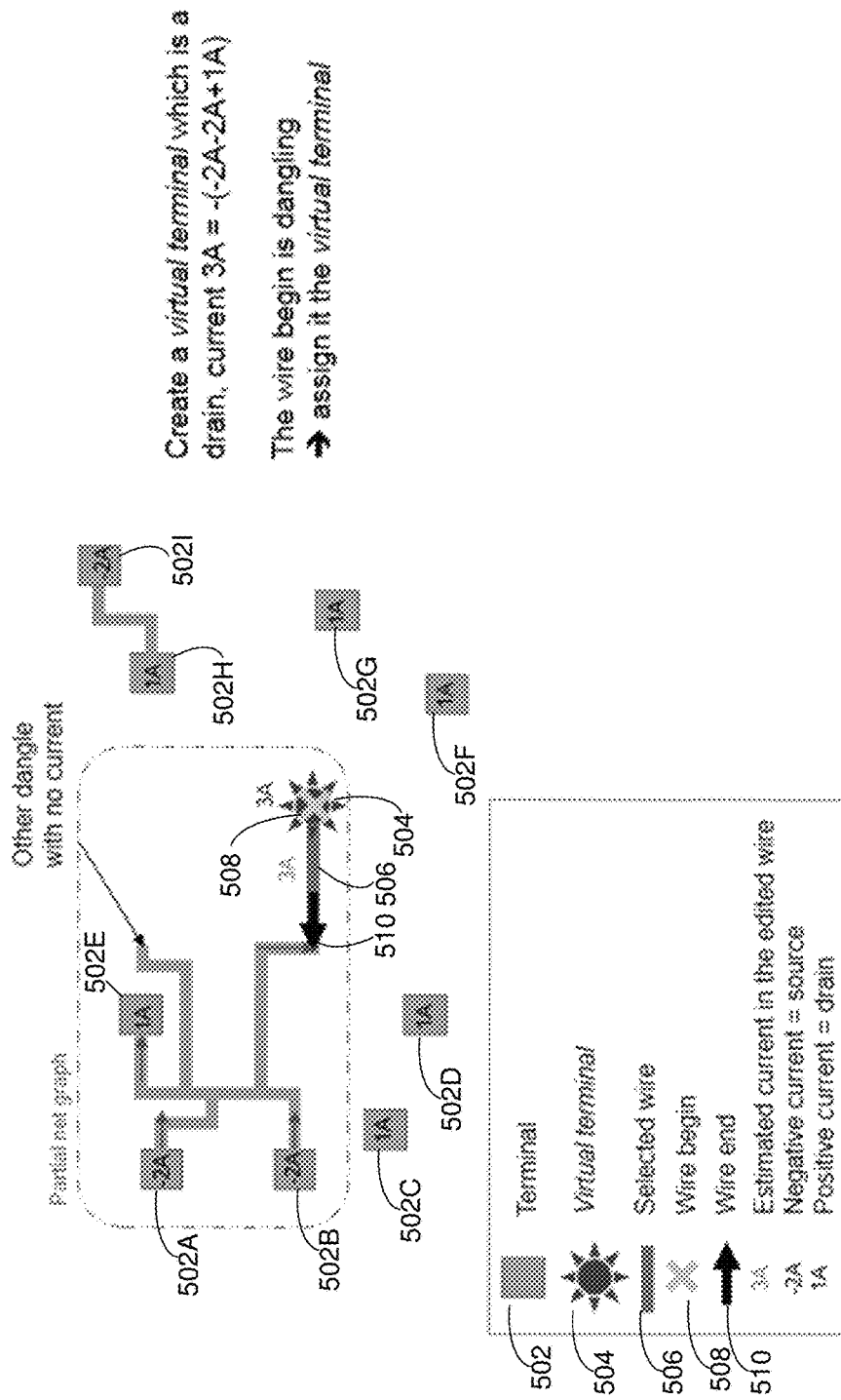
FIG. 5 is an illustration of a schematic of a current estimation process according to an embodiment of the present disclosure.

In some embodiments, and referring now to FIGS. 4-9, embodiments of current estimation process 10 are provided. In some embodiments, the location of the virtual terminal may be either the beginning 408 or the end 410 of wire A. It is very important to not overestimate the wire width. FIGS. 4-9 indicate possible locations of the virtual terminal listed in order of priority. FIG. 4 depicts an example where the wire A end 410 is dangling and FIG. 5 depicts an example where the wire A beginning 508 is dangling. Each of these examples show the creation of a virtual terminal, which is configured as a drain. As shown in the Figures, terminals 402 may be connected via wires and a user may select one of the wires 406 for further analysis. In this way, current estimation process 10 may create virtual terminals 404 at one or more wire ends 410 that are not connected to any other components (e.g., these may be used as future connections to the remaining pins). Accordingly, all of the missing current is going through the last edited wire.

Figure 6:
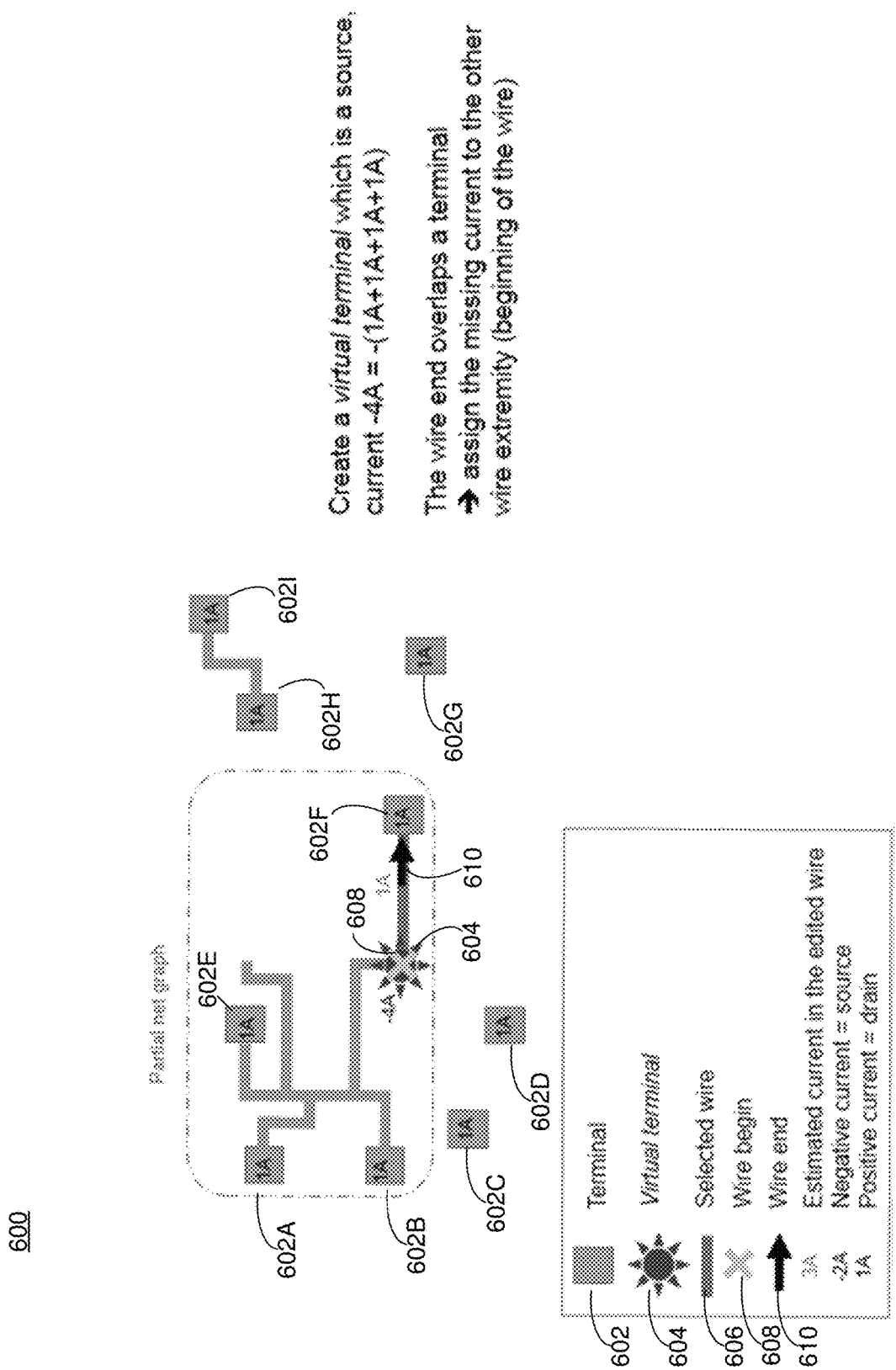
FIG. 6 is an illustration of a schematic of a current estimation process according to an embodiment of the present disclosure.
Figure 7:
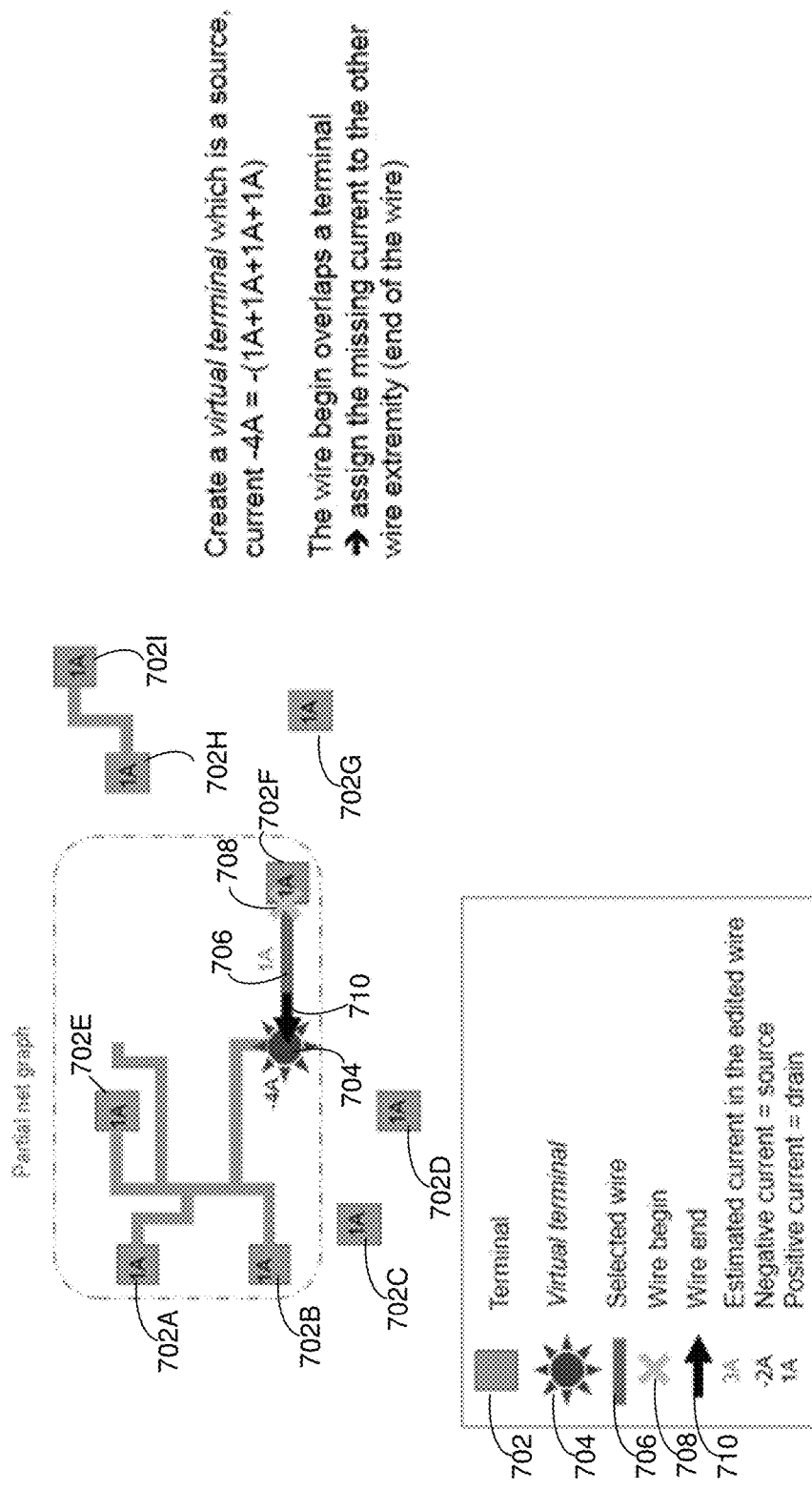
FIG. 7 is an illustration of a schematic of a current estimation process according to an embodiment of the present disclosure.

Referring also to FIGS. 6-7, additional embodiments consistent with current estimation process 10 are provided. These examples depict situations where a wire extremity may overlap a particular terminal and also show the creation of a virtual terminal that may be configured as a source. For example, if one of the extremities of wire A overlaps a terminal, current estimation process may use the other wire extremity for the virtual terminal as shown in the Figures. In other words, when one end of the edited wire is overlapping a terminal, current estimation process 10 may be configured to place the virtual terminal on the other side of the wire. Accordingly, the edited segment may carry only the current of the real terminal. For example, in FIG. 6, virtual terminal 604 is placed on the opposing side of the wire (i.e., wire beginning 608) because of the overlap at terminal 602F.

Figure 8:
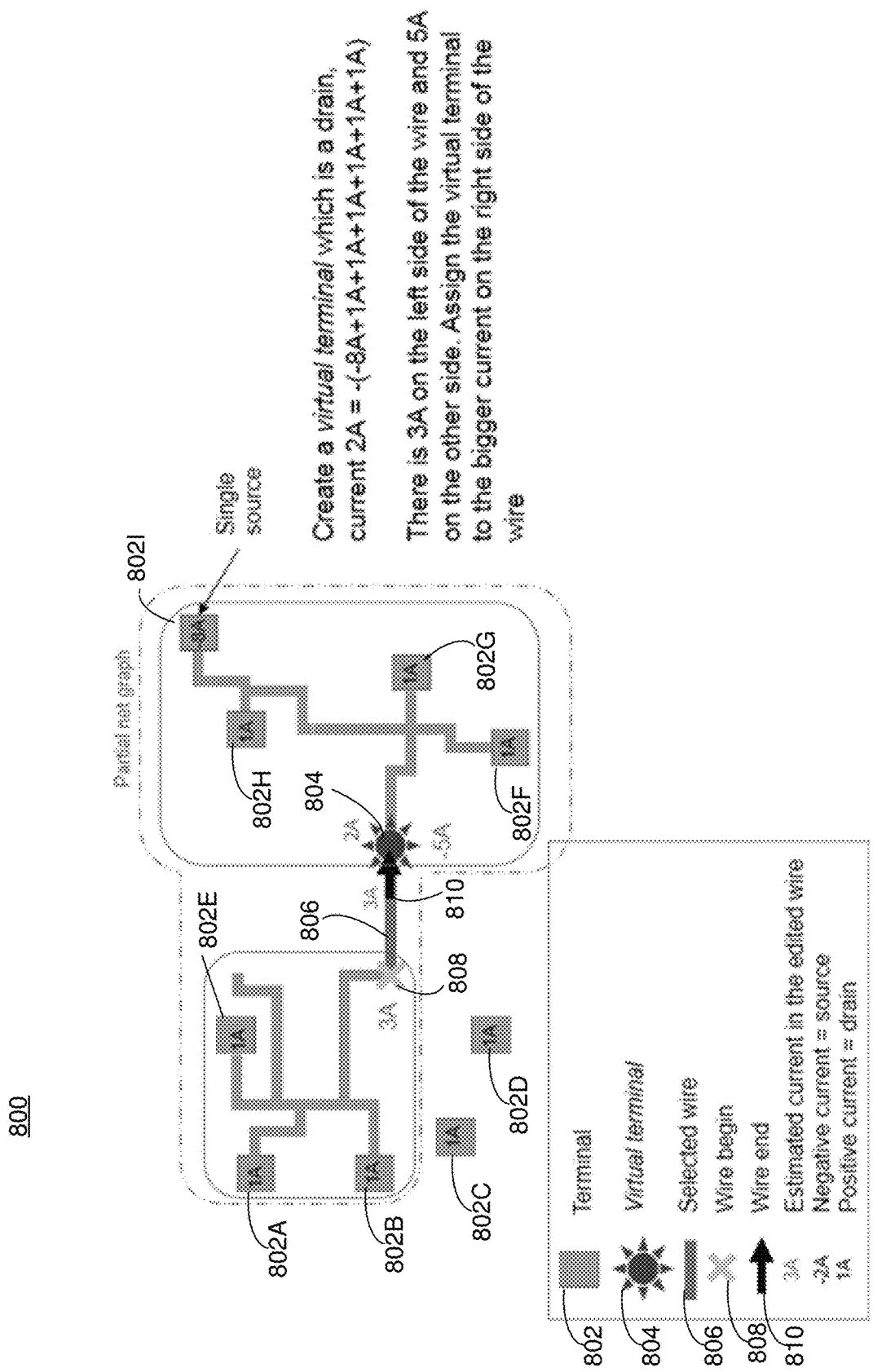
FIG. 8 is an illustration of a schematic of a current estimation process according to an embodiment of the present disclosure.
Figure 9:
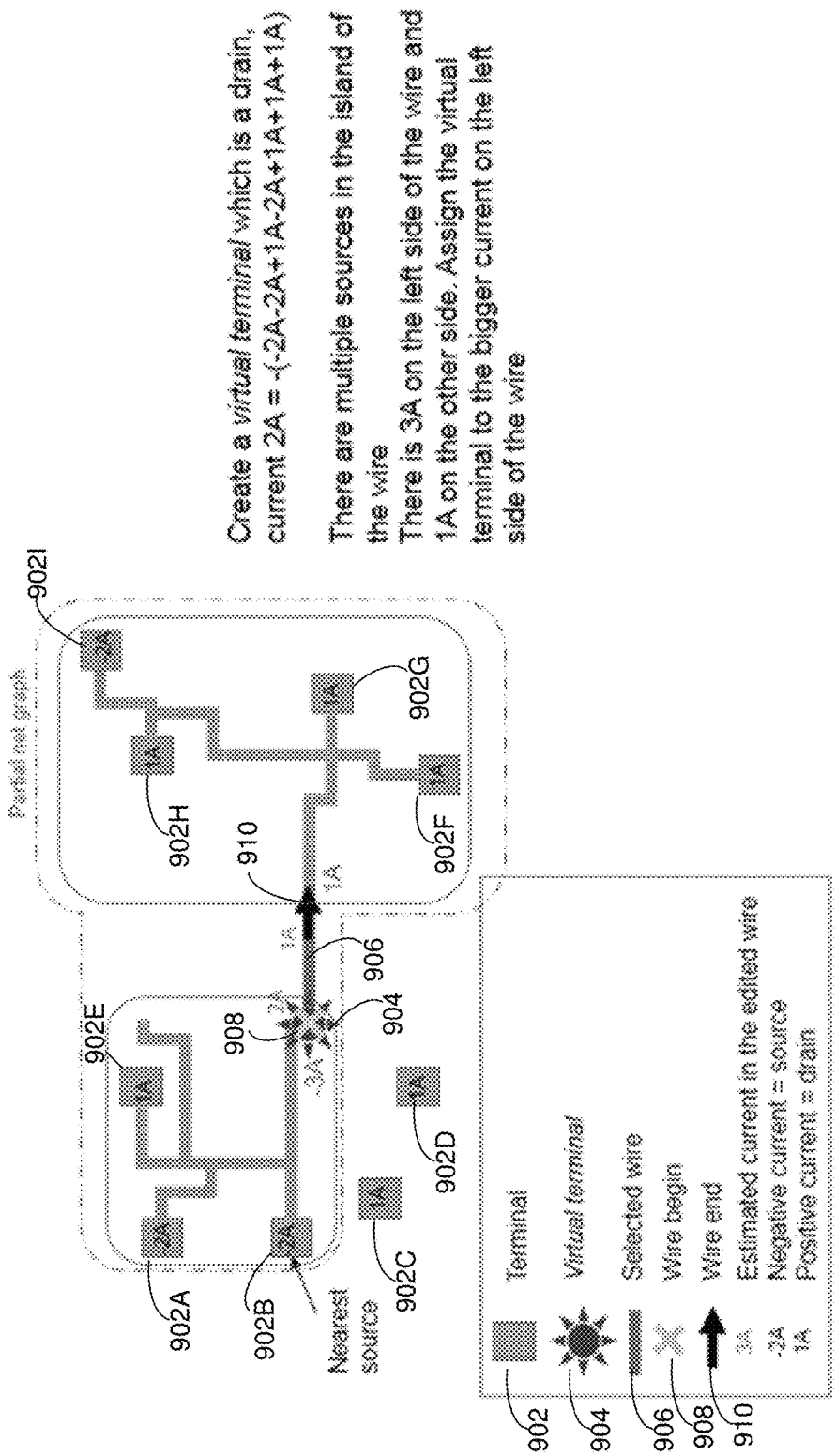
FIG. 9 is an illustration of a schematic of a current estimation process according to an embodiment of the present disclosure.

Referring also to FIGS. 8-9, additional embodiments consistent with current estimation process 10 are provided. These examples depict an example for use in connecting two islands with a single source (see FIG. 8) and multiple sources (see FIG. 9). These examples of current estimation process 10 may create a virtual terminal that is configured as a drain. In some embodiments, the wire may only carry the terminal current. The wire A extremity that is connected to more current. Here, the wire may only carry the smaller current between its two extremities (see, e.g., FIGS. 8-9). Embodiments of current estimation process 10 may be configured to automatically place virtual terminals where there is more current when connecting two groups of wires. In this way, the edited wire may only carry the smallest current between the two groups of wires and is not oversized. Embodiments of current estimation process 10 may be configured to manually place virtual terminals when connecting two groups of wires. In this way, the edited wire may carry either the smallest or biggest current between the two groups of wires according to user choice.

As shown in FIGS. 4-9, embodiments of current estimation process 10 may be configured to allow for the creation of virtual terminals to be able to apply Kirchhoff's law. As opposed to decreasing the current of terminals so that the sum of current for all terminals is equal to zero, current estimation process 10 may allow for the creation of one or several virtual terminals which are assigned the missing current so that it may be possible to apply the Kirchhoff's law to compute the current in the wires that connect the terminals.

In some embodiments, current estimation process 10 may be configured to display the connection points in the design which can accept missing current=virtual terminals. In order to help the user understand where he or she may continue the routing without creating electromigration violations, current estimation process 10 may be configured to display the location of the virtual terminals. The virtual terminals are anchor points to know where the future wire connection may be made.

Figure 10:
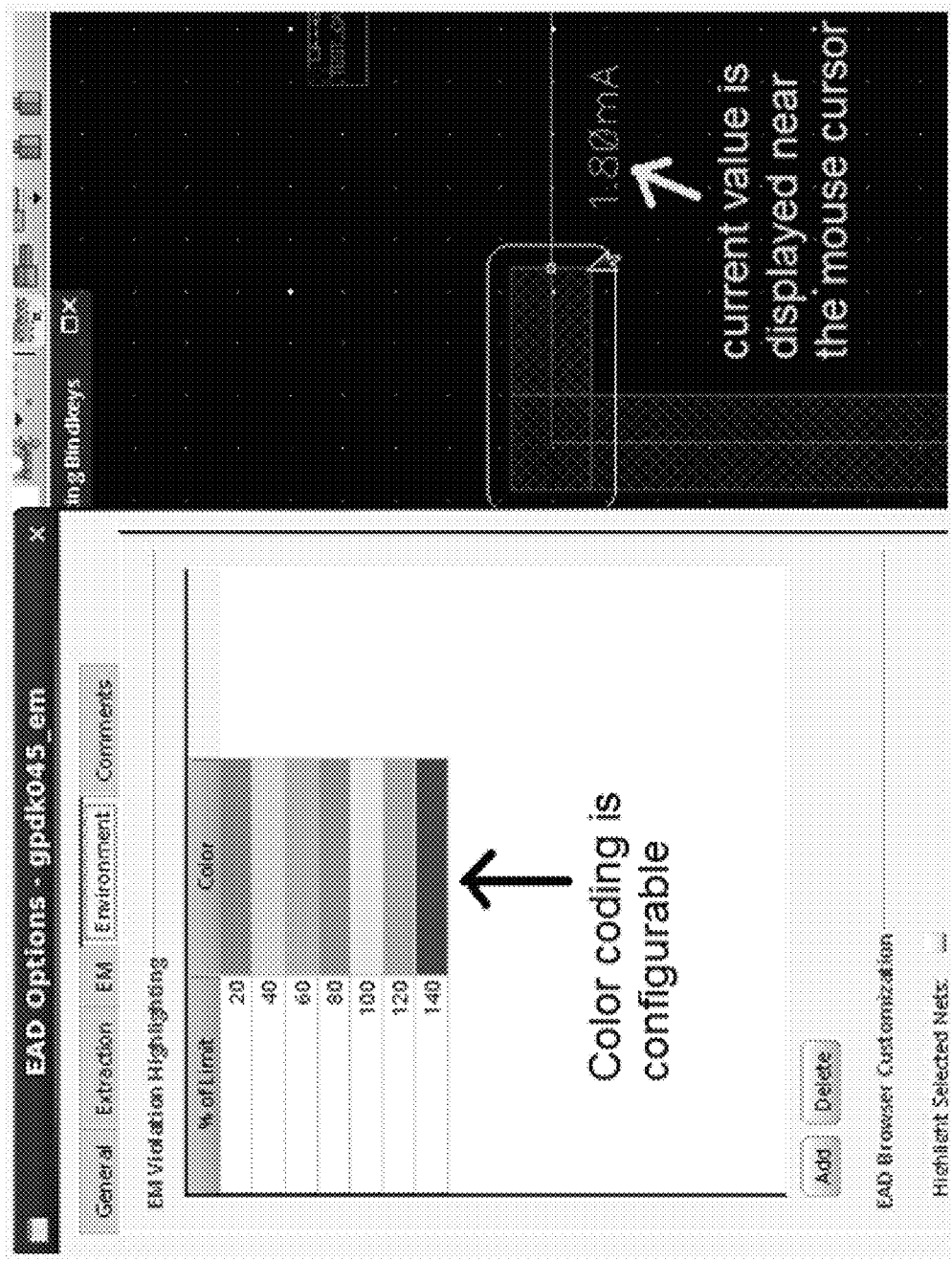
FIG. 10 is an illustration of a graphical user interface of a current estimation process according to an embodiment of the present disclosure.

In some embodiments, current estimation process 10 may be configured to display and color the estimated current to describe if the actual wire width may carry the estimated current or net. In a partially routed design, current estimation process 10 may display the current value for the last edited segment. Current estimation process 10 may also use a configurable color coding to indicate if the actual wire width will match or not. Additionally and/or alternatively, current estimation process 10 may suggest the desired wire width that is supposed to be used to carry the current in the wire (see, e.g., FIG. 10). For example, if the expected width to carry 1 Amp is 10 um, and if the wire width is 5 um, the wire may carry only 0.5 Amp so it may be colored red on graphical user interface 1000 (e.g., by default) because it is two times smaller than expected. If the wire width is 10 um then it may be displayed in green. If the wire width is 20 um then it may be displayed in blue because it is two times larger than expected.

Existing approaches just reduce the source current to get a sum of terminals current equal to zero which leads to underestimating the current in the wires. Or these approaches may just assign the missing current to the wire end (and do not analyze which wire extremity is the best) which also leads to underestimating the current. This may generate random results depending on the direction of the wire.

Embodiments of current estimation process 10 may return more precise and robust (not random) results. Moreover, in the event there is an incorrect estimation current estimation process 10 may overestimate the current in the wire instead of underestimating it. This is preferable to apply design correction interactively while the user is routing a design manually. Overestimating the current will generate fix that create larger wires with less current density errors. This is the opposite if the current is underestimated as the design will be smaller but with more manufacturing/EM errors so it will be more difficult to fix all design errors before sending the design to tapeout.

Embodiments of current estimation process 10 do not require building the entire net graph to get a net topology and satisfy the Kirchhoff's current laws. In contrast, current estimation process 10 may build the graph of the existing topology of a net (this is much easier and faster as it does not require a complex wire planning algorithm).

Additionally and/or alternatively, current estimation process 10 may be configured to overestimate wire current in case of error, as opposed to underestimating the current if the user wants to use this current value to resize the wires and avoid electromigration issues.

Embodiments of current estimation process 10 is fast enough to be used during manual editions to interactively adjust the wire width based on current. As such, it is better than relying on a post process once the net is entirely routed. In this way, obtaining immediate current information while doing manual editing is preferable to waiting for having finish the entire routing of a net to be aware of electromigration and current density problems. Accordingly, current estimation process 10 may help the designer converge faster to an error free design.

In some embodiments, current estimation process 10 may also be configured to allow for the generation of virtual node manually. Accordingly, the process may allow the user to create virtual terminals, select their location and assign current to them. Accordingly, the user may have a better control of the tool that will compute the currents in the already routed part of the design. Manually creating the virtual terminals may allow the user to specify where he or she will connect the remaining real terminals and the tool won't make mistakes when computing the current in the existing wires.

Referring now to FIGS. 11-21, embodiments of the present disclosure related to optimization process 11. Optimization process 11 may include a methodology to optimize wires width while satisfying complex electromigration rules during interactive layout editions.

With electronic designs becoming smaller, it is crucial to fix current density and EM errors sooner in the design flow. Furthermore, the electromigration rules provided by foundries are more and more complex. Having tools that can consider all the parameters of the EM rules and optimize each one, improves the designs efficiency.

Usually, verification tools need a fully routed net to be able to extract information used to verify the rules. Then rules may be evaluated and the wires may be updated or rerouted to solve EM issues.

In order to reduce the number of routing/EM validation iterations and to reduce the design size while satisfying electromigration rules, embodiments of the present disclosure propose a mechanism to guide the user while he or she creates/edits the wires manually. In some embodiments, the present disclosure may be configured to display information about parameters impacting the EM rules such as the current and the EM length. Embodiments included herein may also be configured to provide visual notifications to propose multiple routing strategies to the user. The user simply chooses the strategy to improve its routing while satisfying EM rules. This methodology allows the designer to manually route the wires more quickly without EM violations and with the smallest design size so at a better cost.

In existing systems, when a layout design contains critical nets from an EM point of view, these nets are routed first. This job may be performed manually by expert designers. Then there may be two methodologies to converge to a complete routing without EM rules violations. In the first methodology, the designer may route an entire net, then he or she may run an electromigration checker. Then the designer may attempt to manually address the violations by increasing the width of the wires which are too small and sometimes he or she may be forced to reroute the entire net. Then, the designer may run the checker again, review the new failures and fix them. These iterations can be very long and there can be many iterations.

As discussed above, the process described above may be configured to automatically size the wires based on current estimations in the edited wire. When the wire is routed, the checker may report only a few errors because of the estimation made during the interactive editing. As such, the number of iterations required to converge to an error free design is much smaller. This methodology is rather pessimistic and can slightly oversize the wires.

The first existing solution is time consuming and usually the unique suggestion provided by the tool is to increase the wire width to fix the electromigration issue. It takes time and produces bigger chips compared to the optimal ones. The second existing solution is more effective however, similar to the first solution, it adjusts only the wire width and considers that the current, the routing layer and the wire length are given by the user and cannot be changed. As such, it often leads to route nets with wires which have a bigger width compared to the optimal solution. The optimal solution would have used another routing layer or changed the length of the wires.

Embodiments of optimization process 11 may improve upon existing techniques in order to be able to consider the current, the wire width, the layer and the EM length at the same time. This arrangement would allow designers to quickly produce optimal routing using less resources.

Referring again to FIG. 2, a flowchart showing operations consistent with optimization process 11 is provided. The process may include receiving 1102, using a processor, the electronic design and estimating 1104 a wire width associated with the electronic design based upon, at least in part, a current in a wire, a layer of the wire, a temperature, and an electromigration length. Embodiments may further include allowing 1106, at a graphical user interface, a user to make an edit to a shape or a layer of the wire and generating 1108 a revised EM length, based upon, at least in part, the edit. Embodiments may also include generating 1110 one or more EM length breakpoints based upon, at least in part, the revised EM length and one or more EM rules.

In some embodiments, the equations used to estimate the wire width according to the current that satisfy the EM rules may be based upon multiple parameters. Some of these may include, but are not limited to, the current in the wire, the layer of wire, the EM Length. The EM length may refer to the longest path between 2 edges/end-points of the island irrespective of the direction of current flow (see FIG. 11). In some embodiments, the layer of the wire may be selected by the user when he/she interactively draws the wire. Additionally and/or alternatively, one or more engines may be used to compute the layer automatically for short connections. These may use a layer in a range specified by the user and the layer may be selected in a range to minimize the wire resistivity to get the smallest width to carry all the current. The resistivity of each layer may be specified in the technology settings provided by foundries.

Figure 11:
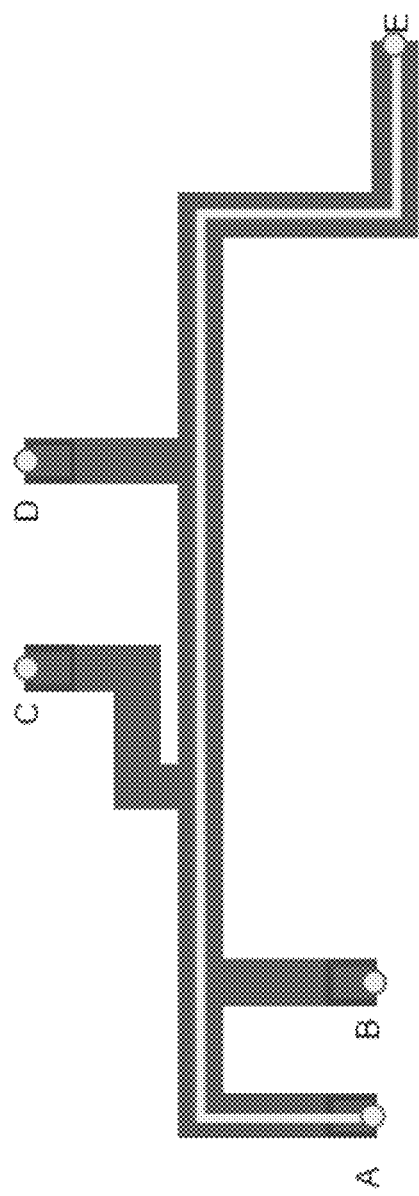
FIG. 11 is a schematic showing an example of EM length according to an embodiment of the present disclosure.

In the example shown in FIG. 11, the EM Length for all segments in this testcase may refer to EMLength=max (for all End Points pairs) of distance (EndPoint to EndPoint), where an End Point is the extremity of a shape that is not connected to any other shape. In the example of FIG. 11 there are five End Points (e.g., A, B, C, D, E). For each possible pair (10 in FIG. 11), the process may compute the physical distance between the 2 End Points. The EMLength may be the longest distance. (Distance A<->E in FIG. 11).

In some embodiments, the temperature of the wire may be one of the parameters. The temperature may be provided by the user. This temperature is difficult to estimate, as such, it may be approximated according to the area of the wire in the chip after running thermal simulations. The thermal simulation may estimate the temperature in multiple regions of the chip. Additionally and/or alternatively, the user may use the worst expected temperature of the chip. As the temperature increases, the width of the wires must be larger. Accordingly, users are often pessimistic when setting the temperature used to compute the electromigration.

In some embodiments, the current may depend on the wire connections and it can be estimated in the wire using methodologies provided above with reference to current estimation process 10. When a wire connects multiple pins (e.g., more than 2), then it may be composed of multiple branches. Each branch may have its own value of the current that goes through it. Estimating the current in the branch that the tool is trying to size automatically is critical. As the final routing is not known yet, the current in each branch may change after routing each new connection. Some techniques include estimating the current in a user edited wire branch. The process may automatically compute the current, but the user may configure it to get a better estimation of the real current that will go through each branch of the wire when the routing will be completed. In some cases, the user may better understand what the final routing will look like, as such, in many situations the user may compute the current on their own and enter it in EDA application 20 to obtain more accurate width estimation.

In operation, while interactively editing a wire, the user may still change the layer of the wire and its shape. The EM Length may correspond to the longest point to point distance between shapes connected together on the same layer. Changing the layer of a shape, splits the previous groups of shapes connected together on the same layer on multiple smaller group of shapes and the EMLength path into shortest paths. Accordingly, the EMLength may be smallest. Reducing the EM Length may often reduce the wire width required to satisfy the EM equation. Furthermore, on the new layer, the equation may differ with potentially different breakpoints. In some embodiments, the process may switch the layer of last edited segment of the wire without changing the layer of the entire wire (all segments). In this example, most of the segments may remain on the same layer, but the last segment may be switched to a different layer. The EMLength for the previous segments may be reduced, and the EMLength for the last segment may now be limited to the length of this segment so it may also be smaller. The user may change the layer and the process may estimate the impact of such a modification and subsequently display information to the user.

Figure 12:
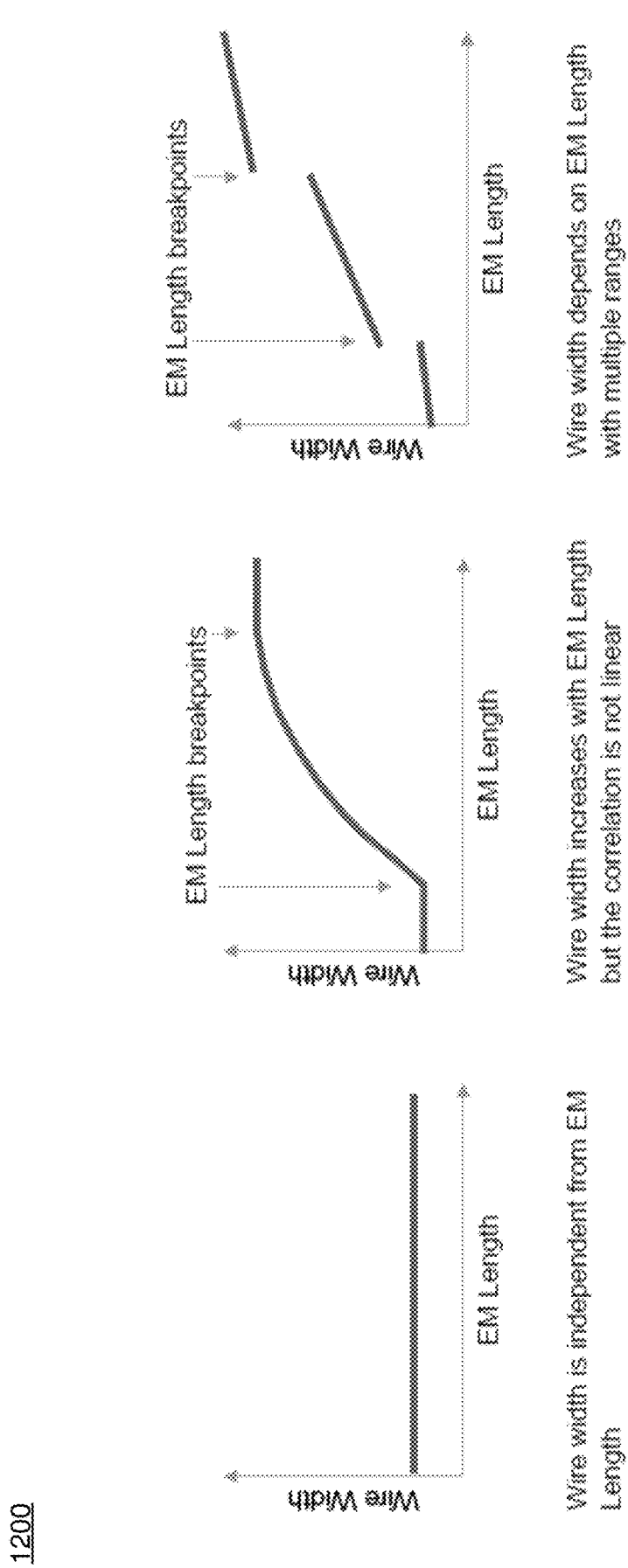
FIG. 12 is a schematic showing examples of EM rules according to an embodiment of the present disclosure.

In some embodiments, the shape of the wire and especially its length may impact the EM Length parameter of the EM rules equations. Referring now to EM rules equations (FIG. 12), it is shown that there are multiple profiles for the width computation according to the EM rules. Being able to visualize the EM Length and especially where it impacts the EM equation (the EM Length breakpoints) can be very useful to help the user anticipate the width of the final wire and optimize its design. In some embodiments, the EM Rules may define the wire width according to one or more parameters. Some parameters may include, but are not limited to, the current, the shape layer, the EM Length, the temperature, etc. Examples depicting graphical plots of the Wire Width vs. EM Length for a given current, layer and temperature are shown in FIG. 12.

Figure 13:
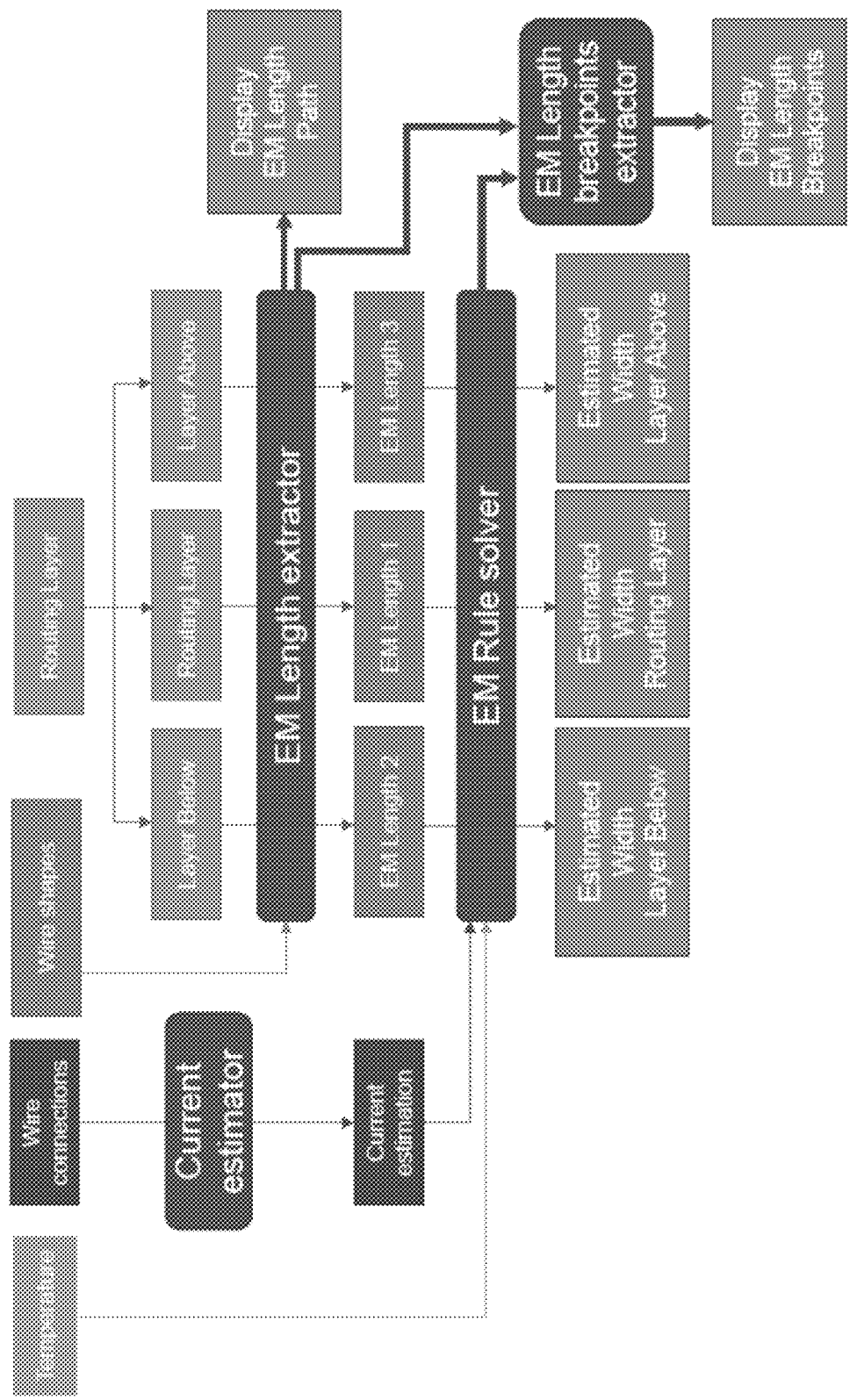
FIG. 13 is a flowchart of an optimization process according to an embodiment of the present disclosure.
Figure 14:
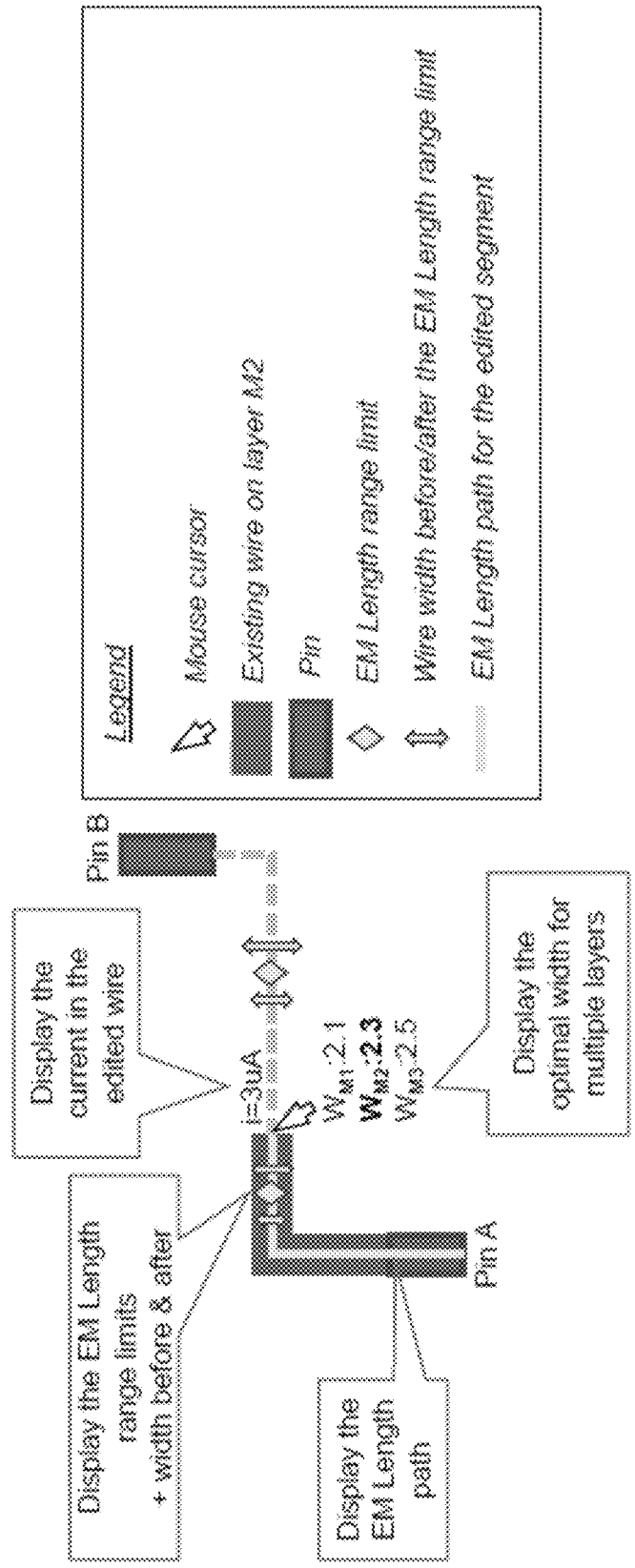
FIG. 14 is an illustration of a schematic showing a display according to an embodiment of the present disclosure.

Referring now to FIGS. 13-14, embodiments showing a flowchart and example schematic are provided. Embodiments of the present disclosure may be configured to extract and display the path of the EM Length for the current edited wire with a highlighted line in the layout canvas, so the user knows if its wire impacts the EM Length or not. In operation, and as shown in FIG. 14, optimization process 11 may estimate the current in the edit wire close to the mouse cursor then may display various features at a graphical user interface. For example, the process may display the EM Length path used for the current wire, the EM Length range limits, the estimated current, the width that satisfy the EM rules for the active routing layer and the two adjacent layers (e.g., both above and below).

In some embodiments, optimization process 11 may display special markers at the location where the EM length generates a strong modification in the EM rules. It displays a marker plus the width before and after these "breakpoints". The user may anticipate the wire position that will impact the width and choose other routing strategies to avoid routing the wire width a big width. Finally, optimization process 11 may also display the estimated width that satisfy EM rules for the adjacent routing layers if they had been used since the last click point.

Figure 15:
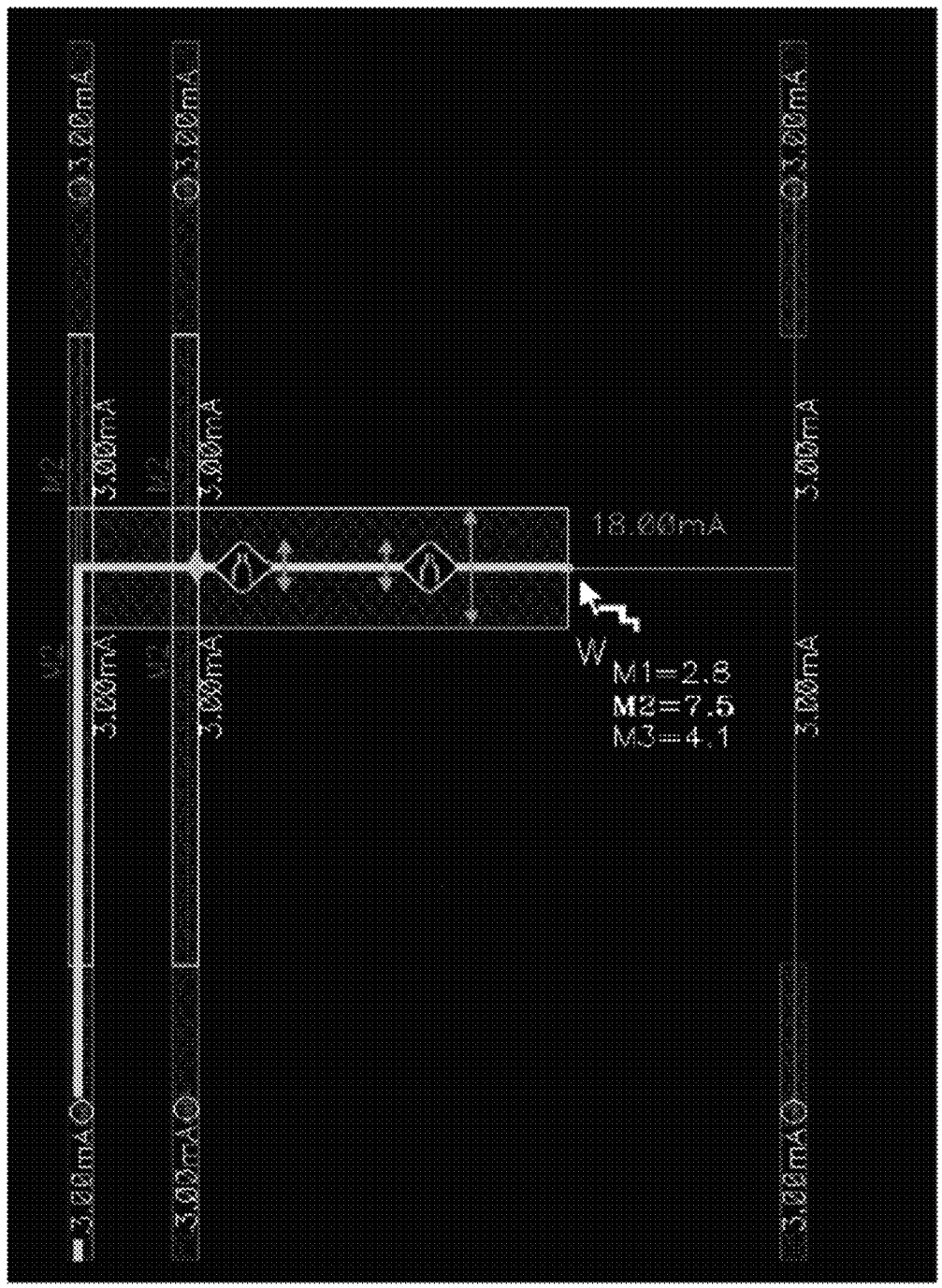
FIG. 15 is an illustration of a schematic according to an embodiment of the present disclosure.

Referring now to FIG. 15, an example screenshot consistent with optimization process 11 is provided. Screenshot 1500 shows a screenshot of an EDA application using in accordance with optimization process 11.

Figure 16:
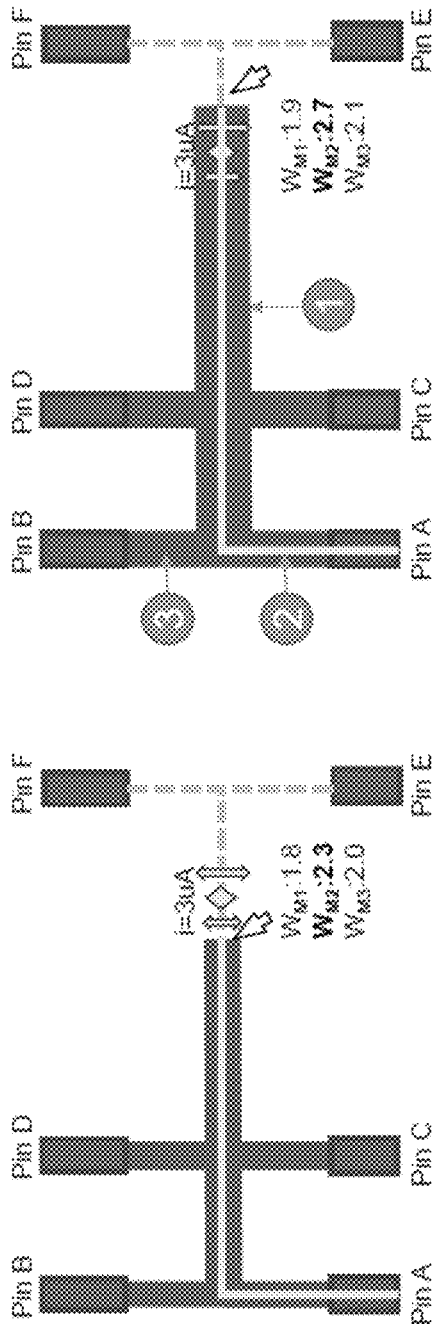
Figure 17:
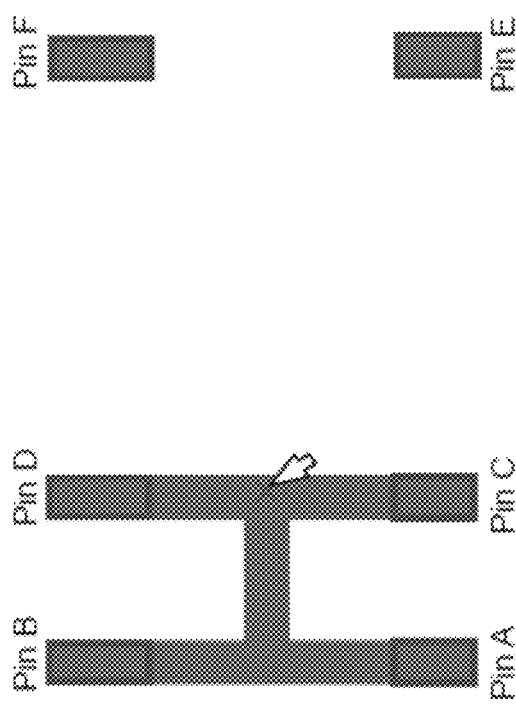

Referring now to FIGS. 16-21 a routing example consistent with optimization process 11 is provided. In operation, and as shown in FIG. 16, when moving the mouse cursor the width of all the segments impacted by new EM Length value, may be dynamically adjusted. Referring also to FIG. 17, prior to initiating an edit the user may start creating a new wire segment from existing wires. The user may select the starting point.

Figure 18:
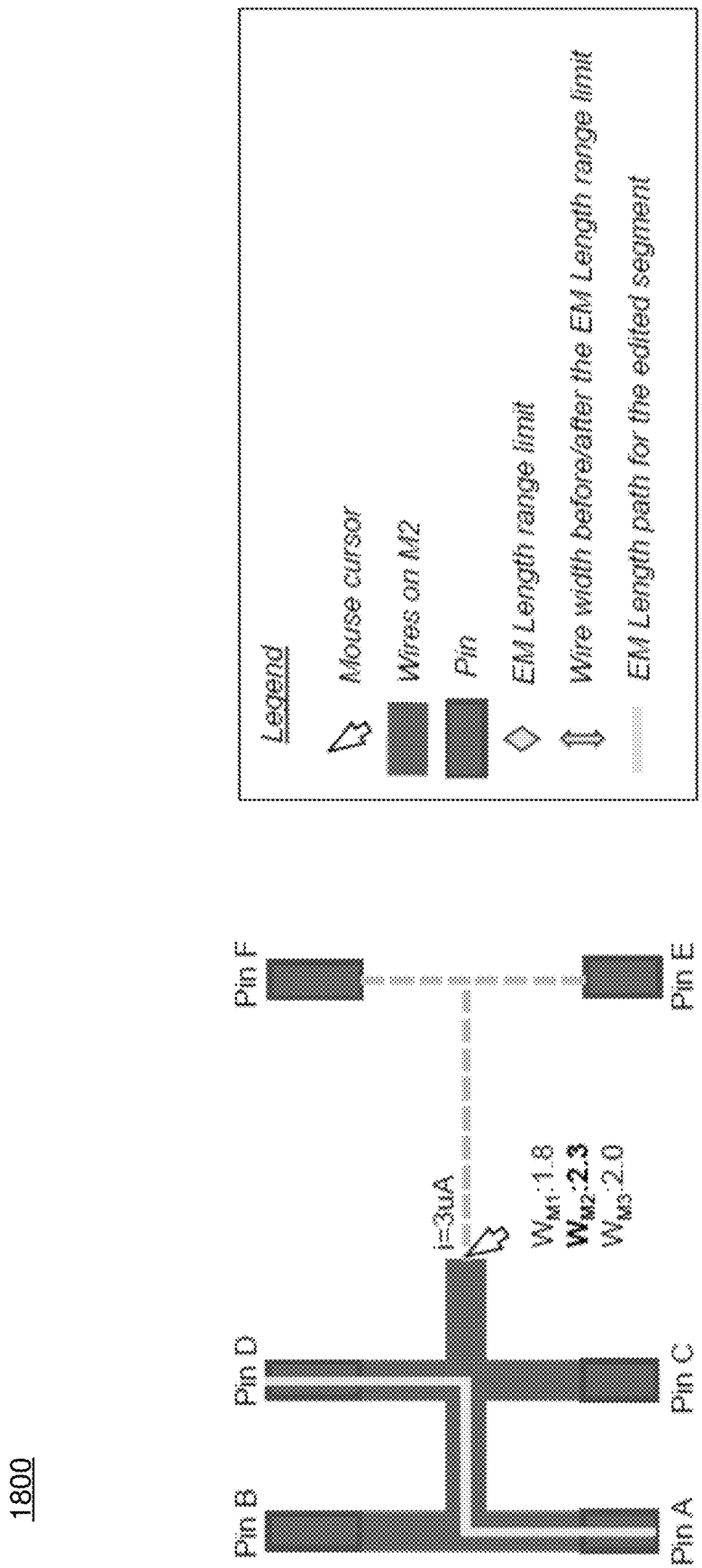

Referring also to FIG. 18, after starting the edition of the segment, for each mouse cursor movement one or more of the following operations may be performed. The edited segment may be redrawn, the current in the edited segment may be automatically estimated and displayed (i=3 uA), the EM Length path may be recomputed and displayed, the edited segment width may be adjusted to satisfy the EM rules with the new EM Length path, the width of all segments impacted by the new EM Length path is adjusted to satisfy the EM rules, the wire width of the edited segment may be displayed ($W_{M2}$:2.3), the tool also estimates the wire width of an equivalent segment using the adjacent routing layers ($W_{M1}$, $W_{M3}$) instead of current layer (M2).

In the particular example shown in FIG. 18, at this mouse location, the EM length used for the current segment doesn't include yet the current segment. The EM Length path used to auto-compute the width of the edited segment may be displayed. The user may know that the length of the edited segment may not impact the EM Length. The user may also know that the length of the edited segment may not impact the EM Length. The user may also see the wire width required to satisfy the EM rules on the active layer and also on the layer above or below. As such, the user may decide if he/she routes this wire on the active layer or if they select another layer to optimize the size of the wire.

Referring now to FIG. 19, after increasing the length of the edited segment the display may be updated. In operation, after moving the cursor farther and reaching a given wire length, the new segment may now impact the EM Length path. Here, the current in the edited segment may be automatically estimated and displayed (i=3 uA), the EM Length path may be recomputed and displayed, the segment width may be adjusted to satisfy the EM rules with the new segment. It is impacted by the new EM Length path, the wire width of the segment may be displayed ($W_{M2}$:2.3). Optimization process 11 may also estimate the wire width of an equivalent segment on the adjacent routing layers ($W_{M1}$, $W_{M3}$). The EM Length path used to auto-compute the width of the edited segment may be updated. There are also markers indicating where the EM Length may impact the EM rules used to compute the width of the segment. The user may know that the length of the edited segment impacts the EM Length. The user may also knows where to stop the wire or change the layer to avoid increasing the width of its wire.

Figure 20:
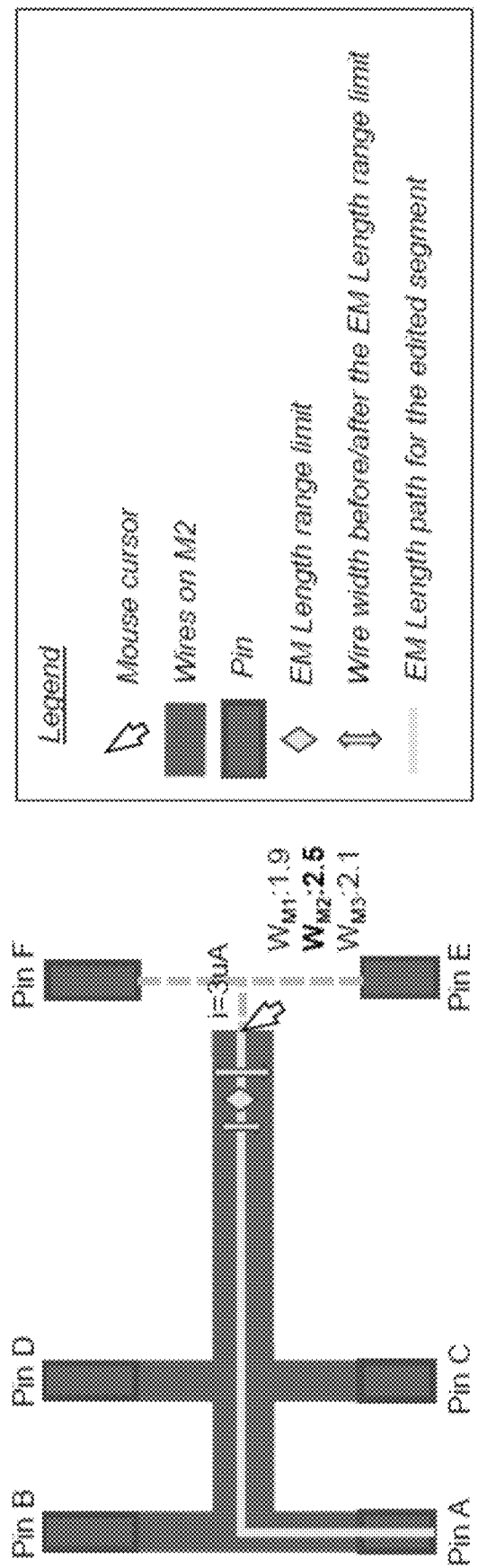

Referring now to FIG. 20, after passing an EM Length marker optimization process 11 may update the display. In operation, after passing an EM Length marker, the width of the wire suddenly changes because the EM rule used to compute the width from the current has changed. By using this EM Length representation, the user may know how to optimize the width of its wire and reduce its design size while being EM rules compliant. The user may also know in advance if changing the routing layer would be beneficial or not. The current in the edited segment may be automatically estimated and displayed (i=3 uA), the segment width may be adjusted to satisfy the EM rules with the new segment. It is impacted by the new EM Length path, the width of all segments may be impacted by the new EM Length path is adjusted to satisfy the EM rules, the wire width of the segment may be displayed ($W_{M2}$:2.5), the tool may also estimate the wire width of an equivalent segment on the adjacent routing layers ($W_{M1}$, $W_{M3}$).

Figure 21:
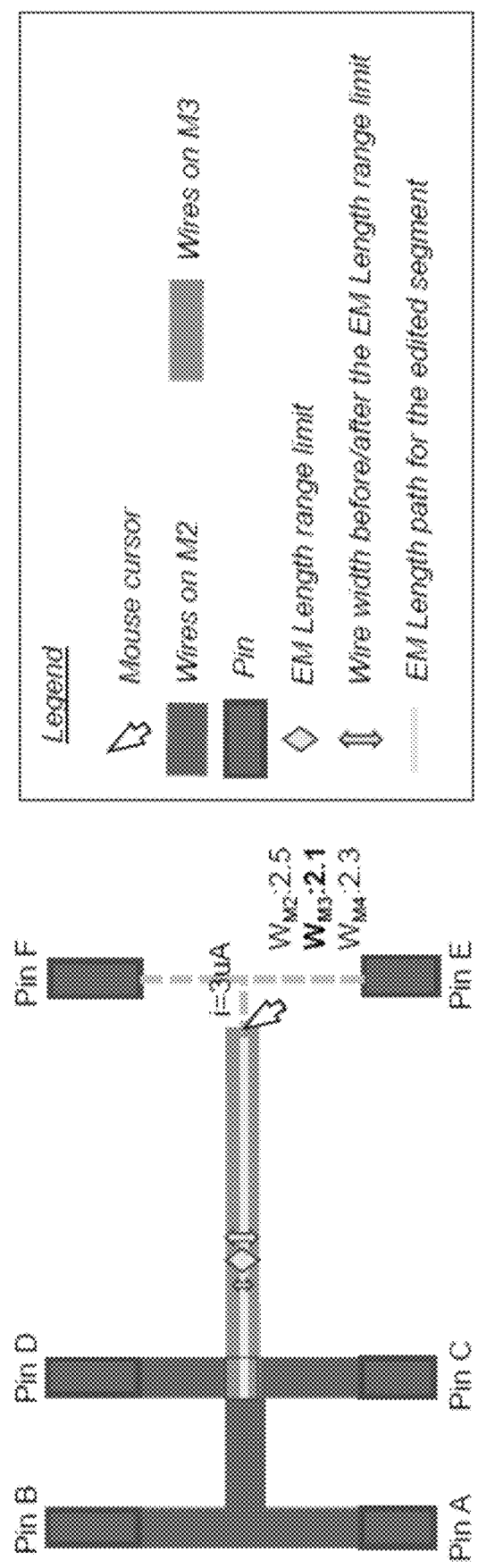

Referring now to FIG. 21, after switching to another routing layer the wire width and EM length may be adjusted to take into account the new routing layer. In operations, the user may select another routing layer. The layer of this segment may be immediately updated and via drop added at the last click. The current in the edited segment may be automatically estimated and displayed (i=3 uA), the EM Length path is recomputed for the new layer and displayed, the edited segment width is adjusted to satisfy the EM rules with the new EM Length path, the wire width of the edited segment is displayed ($W_{M3}$:2.1), the tool also estimates the wire width of an equivalent segment using the adjacent routing layers ($W_{M2}$, $W_{M4}$) instead of current layer (M3).

Accordingly, embodiments of optimization process 11 may provide a faster routing tool and give intuitive control to the user to perform an optimal device level block routing that will satisfy electromigration rules. Embodiments included herein provide more feedback about all the parameters that impact the electromigration rules while doing interactive editing. Instead of suggesting only to change the wire width, it provides multiple routing alternatives (e.g., changing the width, using other routing layers, changing the topology of the wire), so the user may select the best way to route its wire correctly and efficiently on the first shot. Conventional implementations display a large quantity of information about the electromigration rules, but only when the wire is fully routed, and it is only in huge external spreadsheets where the relevant information is hard to extract. Embodiments included herein may interactively present, in a concise graphical way in the layout itself, multiple "what if" scenarios and lets the user select the best one. Designers keep the control on the routing while they are given pertinent advice. Embodiments of the present disclosure may present graphically electromigration information simply and quickly so the designer may route very quickly the critical nets by choosing the best routing options. This process may generate smaller designs and so reduce their production cost while maintaining their efficiency.

It will be apparent to those skilled in the art that various modifications and variations can be made in the current estimation scheme and debugging process of embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for use with an electronic design comprising:
   receiving, using a processor, the electronic design;
   identifying a partially routed net associated with the electronic design;
   determining a missing current needed to satisfy Kirchhoff's Current Law ("KCL") along a portion of a selected wire;
   generating a virtual terminal attached to the selected wire, wherein the virtual terminal is assigned the missing current;
   estimating a wire width associated with the electronic design based upon, at least in part, a current in a wire, a layer of the wire, a temperature, and an electromigration (EM) length;
   allowing, at a graphical user interface, a user to make an edit to a shape or a layer of the wire;
   generating a revised EM length, based upon, at least in part, the edit; and
   generating one or more EM length breakpoints based upon, at least in part, the revised EM length and one or more EM rules.

2. The computer-implemented method of claim 1, further comprising:
   graphically displaying, at the graphical user interface, one or more EM length breakpoints.

3. The computer-implemented method of claim 1, wherein the EM length corresponds to a longest path between two end-points without accounting for a direction of current flow.

4. The computer-implemented method of claim 1, further comprising:
   displaying an EM length path at the graphical user interface.

5. The computer-implemented method of claim 1, further comprising:
   displaying an estimated width associated with a layer below.

6. The computer-implemented method of claim 1, further comprising:
   displaying an estimated width associated with a routing layer.

7. The computer-implemented method of claim 1, further comprising:
   displaying an estimated width associated with a layer above.

8. A non-transitory computer-readable storage medium having stored thereon instructions, which when executed by a processor result in the following operations:
   receiving, using a processor, the electronic design;
   identifying a partially routed net associated with the electronic design;
   determining a missing current needed to satisfy Kirchhoff's Current Law ("KCL") along a portion of a selected wire;

generating a virtual terminal attached to the selected wire, wherein the virtual terminal is assigned the missing current;

estimating a wire width associated with the electronic design based upon, at least in part, a current in a wire, a layer of the wire, a temperature, and an electromigration length;

providing, at a graphical user interface, an edit to a shape or a layer of the wire;

generating a revised EM length, based upon, at least in part, the edit; and generating one or more EM length breakpoints based upon, at least in part, the revised EM length and one or more EM rules.

9. The computer-readable storage medium of claim 8, further comprising:

graphically displaying, at the graphical user interface, one or more EM length breakpoints.

10. The computer-readable storage medium of claim 8, wherein the EM length corresponds to a longest path between two end-points without accounting for a direction of current flow.

11. The computer-readable storage medium of claim 8, further comprising:

displaying an EM length path at the graphical user interface.

12. The computer-readable storage medium of claim 8, further comprising:

displaying an estimated width associated with a layer below.

13. The computer-readable storage medium of claim 8, further comprising:

displaying an estimated width associated with a routing layer.

14. The computer-readable storage medium of claim 8, further comprising:

displaying an estimated width associated with a layer above.

15. A computing system for use in an electronic circuit design comprising:

at least one processor configured to receive the electronic design and identify a partially routed net associated with the electronic design, the at least one processor further configured to determine a missing current needed to satisfy Kirchhoff's Current Law ("KCL") along a portion of a selected wire and to generate a virtual terminal attached to the selected wire, wherein the virtual terminal is assigned the missing current, the at least one processor further configured to estimate a wire width associated with the electronic design based upon, at least in part, a current in a wire, a layer of the wire, a temperature, and an electromigration length, the at least one processor further configured to allow, at a graphical user interface, a user to make an edit to a shape or a layer of the wire, the at least one processor further configured to generate a revised EM length, based upon, at least in part, the edit, the at least one processor further configured to generate one or more EM length breakpoints based upon, at least in part, the revised EM length and one or more EM rules.

16. The system of claim 15, wherein the at least one processor is further configured to graphically display, at the graphical user interface, one or more EM length breakpoints.

17. The system of claim 15, wherein the EM length corresponds to a longest path between two end-points without accounting for a direction of current flow.

18. The system of claim 15, wherein the at least one processor is further configured to display an EM length path at the graphical user interface.

19. The system of claim 15, wherein the at least one processor is further configured to display an estimated width associated with a layer below.

20. The system of claim 15, wherein the at least one processor is further configured to display an estimated width associated with a routing layer.

* * * * *